United States Patent
Umemoto

(10) Patent No.: US 6,863,413 B1
(45) Date of Patent: Mar. 8, 2005

(54) PLANE LIGHT SOURCE UNIT AND REFLECTION TYPE LIQUID-CRYSTAL DISPLAY DEVICE

(75) Inventor: Seiji Umemoto, Osaka (JP)

(73) Assignee: Nitto Denko Corporation, Osaka (JP)

(*) Notice: Subject to any disclaimer, the term of this patent is extended or adjusted under 35 U.S.C. 154(b) by 0 days.

(21) Appl. No.: 09/695,306

(22) Filed: Oct. 25, 2000

(30) Foreign Application Priority Data

Oct. 25, 1999 (JP) .......................................... 11-302619

(51) Int. Cl.[7] .............................................. F21V 7/04
(52) U.S. Cl. ............................ 362/31; 362/19; 362/26; 362/339; 349/63
(58) Field of Search ............................. 362/26, 31, 19, 362/328, 330, 329, 339; 349/63

(56) References Cited

U.S. PATENT DOCUMENTS

| | | | | |
|---|---|---|---|---|
| 4,870,484 A | * | 9/1989 | Sonehara | 358/59 |
| 6,196,692 B1 | * | 3/2001 | Umemoto et al. | 362/31 |
| 6,199,995 B1 | * | 3/2001 | Umemoto et al. | 362/31 |
| 6,266,108 B1 | * | 7/2001 | Bao et al. | 349/63 |
| 6,295,405 B1 | * | 9/2001 | Jannson et al. | 385/146 |
| 6,323,919 B1 | * | 11/2001 | Yang et al. | 349/63 |
| 6,340,999 B1 | * | 1/2002 | Masuda et al. | 349/63 |
| 6,507,378 B1 | * | 1/2003 | Yano et al. | 349/63 |
| 6,607,279 B2 | * | 8/2003 | Niida et al. | 362/26 |

* cited by examiner

Primary Examiner—Thomas M. Sember
Assistant Examiner—Jacob Y. Choi
(74) Attorney, Agent, or Firm—Sughrue Mion, PLLC

(57) ABSTRACT

In a plane light source unit, a light pipe including an upper surface, a lower surface, and an incidence side surface, and including a light output means formed in the upper surface so that light incident on the incidence side surface exits from the lower surface through the light output means while light incident on the lower surface is transmitted through the upper surface; and a linear light source disposed on the incidence side surface of the light pipe, the linear light source having an effective light emission region which is longer than the longitudinal length of the incidence side surface. Information light generated on the lower surface of the light pipe is transmitted and made visible through the upper surface of the light pipe. Further provided is a reflection type liquid-crystal display device in which a liquid-crystal cell is disposed on a lower surface of the above-mentioned plane light source unit, the liquid-crystal cell including a reflection layer.

12 Claims, 2 Drawing Sheets

PLANE LIGHT SOURCE UNIT AND REFLECTION TYPE LIQUID-CRYSTAL DISPLAY DEVICE

BACKGROUND OF THE INVENTION

1. Field of the Invention

The present invention relates to a plane light source unit that can form a reflection type liquid-crystal display device which is excellent in light utilizing efficiency, which is excellent in brightness and which is easy to view.

The present application is based on Japanese Patent Application No. Hei. 11-302619, which is incorporated herein by reference.

2. Description of the Related Art

A plane light source unit which permits a reflection type liquid-crystal display device to be viewed in a dark place, or the like, has been in great demand. In the meantime, the inventor of the present invention has tried to apply a front-lighting system in which a back-lighting type plane light source unit to be used in a transmission type liquid-crystal display device was disposed on the viewing side of a liquid-crystal cell. Such a back-lighting type plane light source unit uses a light pipe provided with a light output means so that light incident on a side surface exits from one of the upper and lower surfaces through the light output means. In the front-lighting system, the contents of display are viewed through the light pipe.

In the background-art plane light source unit using such a back-lighting type light pipe, however, there was a problem that it was difficult to put the plane light source unit into practical use because of shortage of clarity owing to remarkable disorder of a display image through the light pipe in addition to shortage of contrast at the time of switching-on of the plane light source unit and shortage of brightness at the time of switching-off of the plane light source unit. The shortage of contrast and the disorder of display were mainly caused by scattering of display light through a diffusing layer, or the like.

In consideration of the above description, the inventor of the present invention produced a plane light source unit which can suppress production of scattered light, and tried to prevent shortage of contrast and disorder of the display by applying the plane light source unit to a front-lighting system. In this case, however, a difference between brightness and darkness occurred in the plane light source because a luminance leveling effect owing to scattering of light was lost. Hence, it was found that dark portions were formed to cause a problem of missing portions in a display image.

SUMMARY OF THE INVENTION

An object of the present invention is to develop a plane light source unit that can be adapted for a front-lighting system and can form a reflection type liquid-crystal display device which is excellent in contrast in viewing at the time of switching-off of the plane light source unit and at the time of switching-on of the plane light source unit, which is excellent in brightness of display, which is excellent in clarity owing to prevention of disorder of a display image through a light pipe, and which does not generate any partial missing in the display image.

In order to achieve the above object, there is provided a plane light source unit which comprises: a light pipe including an upper surface, a lower surface, and an incidence side surface, and including a light output means formed in the upper surface so that light incident on the incidence side surface exits from the lower surface through the light output means while light incident on the lower surface is transmitted through the upper surface; and a linear light source disposed on the incidence side surface of the light pipe, the linear light source having an effective light emission region which is longer than the longitudinal length of the incidence side surface; whereby information light generated on the lower surface of the light pipe is transmitted and made visible through the upper surface of the light pipe.

According to another aspect of the present invention, there is provided a reflection type liquid-crystal display device in which a liquid-crystal cell is disposed on a lower surface of the above-mentioned plane light source unit, the liquid-crystal cell including a reflection layer.

According to the present invention, a plane light source unit for a front-lighting system, the plane light source being excellent in light utilizing efficiency and excellent in uniformity of brightness can be obtained. Hence, it is possible to obtain a reflection type liquid-crystal display device, which is excellent in contrast in viewing at the time of switching-off of the plane light source unit and at the time of switching-on of the plane light source unit, which is excellent in brightness of display, which is excellent in clarity owing to prevention of disorder of a display image through a light pipe, and which is excellent in display quality owing to suppression of the problem of partial missing in the display image.

Features and advantages of the invention will be evident from the following detailed description of the preferred embodiments described in conjunction with the attached drawings.

DETAILED DESCRIPTION OF THE PREFERRED EMBODIMENTS

A plane light source unit according to the present invention comprises: a light pipe including an upper surface, a lower surface, and an incidence side surface, and including a light output means formed in the upper surface so that light incident on the incidence side surface exits from the lower surface through the light output means while light incident on the lower surface is transmitted through the upper surface; and a linear light source disposed on the incidence side surface of the light pipe, the linear light source having an effective light emission region which is longer than the longitudinal direction of the incidence side surface; whereby information light generated on the lower surface of the light pipe is transmitted and made visible through the upper surface of the light pipe.

Figure 1:
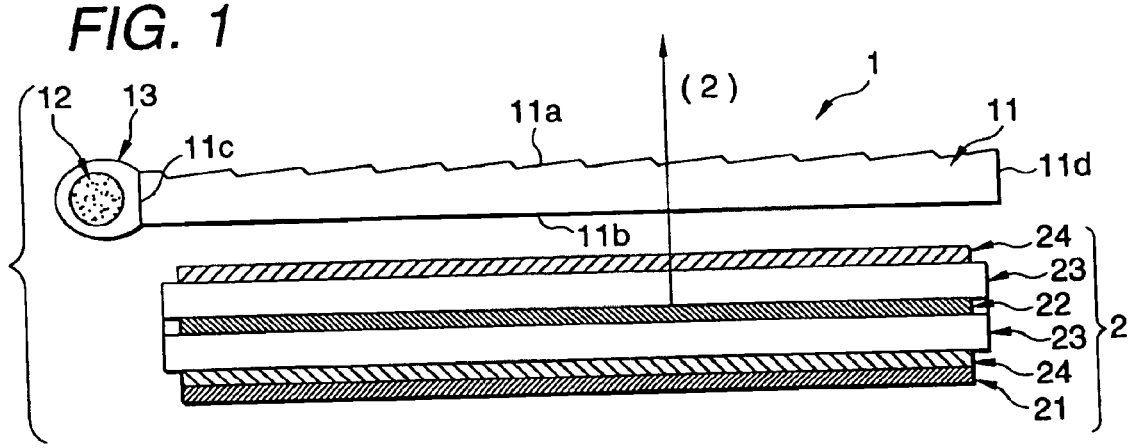
FIG. 1 is a side explanatory view showing an example of a reflection type liquid-crystal display device.

FIG. 1 shows an example of the plane light source unit 1. In FIG. 1, the reference numeral 11 designates a light pipe; and 12, a linear light source. Incidentally, FIG. 1 shows a case where the plane light source unit 1 is applied to a reflection type liquid-crystal display device. The reference numeral 2 designates a liquid-crystal display panel; and 21, a reflection layer.

The light pipe to be used is a plate in which light incident on an incidence side surface exits from a lower surface through a light output means formed in an upper surface. The light pipe is generally constituted by a plate-like member having an upper surface 11a, a lower surface 11b opposite to the upper surface 11a, and an incidence side surface 11c which is one of opposite side surfaces between the upper and lower surfaces 11a and 11b as shown in FIG. 1. The plate-like member may be of a uniform-thickness type as illustrated in FIG. 1 or may be shaped like a wedge, etc. in which a counter end surface 11d opposite to the incidence side surface is set to be thinner than the incidence side surface. The reduction in thickness of the counter end is advantageous in terms of reduction in weight, improvement in entrance efficiency of light from the incidence side surface to the light output means of the upper surface.

The light output means formed in the upper surface of the light pipe may be made of a suitable material exhibiting the aforementioned light output characteristic. In the point of view that the light incident from the incidence side surface is made to exit from the lower surface through the upper surface efficiently with good directivity, and in the point of view that the light incident from the lower surface is made to be transmitted from the upper surface efficiently without any scattering, it is preferable to provide a light output means having slopes facing the incidence side surface. It is particularly preferable to provide a light output means having a repetitive structure of irregularities each constituted by a combination of a slope with an inclination angle in a range of from 30 to 45 degrees with respect to the reference plane of the lower surface, and a flat surface with an inclination angle of not larger than 10 degrees.

Figure 2:
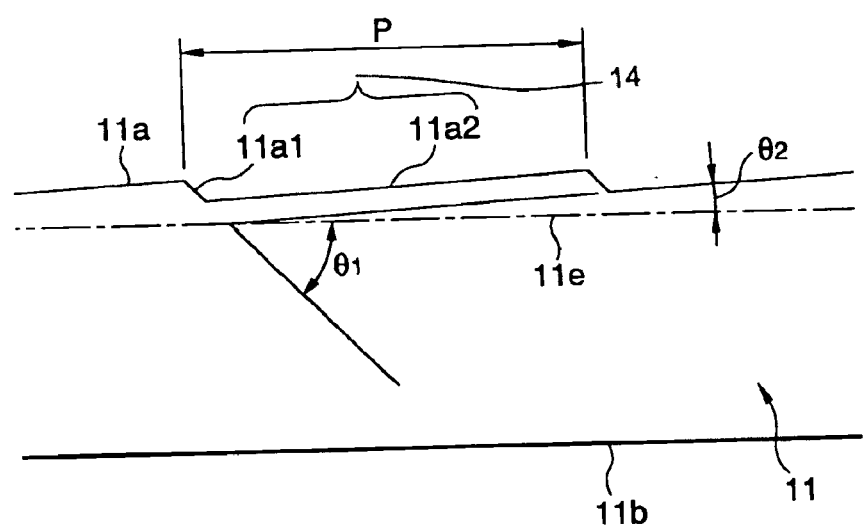
FIG. 2 is a side explanatory view of prism-like irregularities in the light pipe.

The repetitive structure of irregularities may be constituted by convex or concave portions each having equal side surfaces. However, from the point of view of light utilizing efficiency, and from the point of view that the light which has exited from the lower surface is turned over by the reflection layer to exit from the upper surface in a frontal (perpendicular) direction with good directivity, it is particularly preferable that the repetitive structure of the light output means (illustrated as reference 14 in FIG. 2) is constituted by prism-like irregularities each constituted by a combination of a short side surface 11a1 ($\theta_1$) inclined down from the incidence side surface 11c toward the counter end surface 11d at an inclination angle in a range of from 30 to 45 degrees with respect to the reference plane 11e parallel with the lower surface 11b, and a long side surface 11a2 ($\theta_2$) with an inclination angle in a range of from 0 to 10 degrees as shown in FIG. 2. Incidentally, discrimination between convex portions and concave portions is based on a line connecting the short side surfaces and the long side surfaces to a plane for formation thereof. That is, discrimination between convex portions and concave portions is made by the fact as to whether the points (vertices) of intersection between the short side surfaces and the long side surfaces are protruded (convex) from the line or depressed (concave) from the line.

In the prism-like irregularities, the short side surfaces 11a1 perform a role of reflecting a part of light given to the short side surfaces among the light incident on the side surface to thereby supply the reflected light to the lower surface 11b. In this case, the inclination angle $\theta_1$ of the short side surfaces is set to be in a range of from 30 to 45 degrees, so that the transmission light can be reflected perpendicularly to the lower surface. Accordingly, output light (illumination light) excellent in frontal directivity can be obtained efficiently through the reflection layer 21 shown in FIG. 1. Hence, bright display can be achieved.

From the point of view of frontal directivity, etc., the preferable inclination angle $\theta_1$ of the short side surfaces is in a range of from 32 to 44 degrees, particularly in a range of from 33 to 43 degrees, more particularly in a range of from 35 to 42 degrees in consideration of the fact that the condition of total reflection based on the refraction of light transmitted in the inside of the light pipe according to Snell laws of refraction is ±41.8 degrees when, for example, the refractive index is 1.5. Incidentally, a part of light transmitted through the short side surfaces without satisfying the total reflection condition forms leaking light. The leaking light has little influence on viewing in a direction near the frontal direction because the leaking light exits at an angle of not smaller than 60 degrees with respect to the frontal direction. If the inclination angle $\theta_1$ is larger than 45 degrees, there is a disadvantage in light utilizing efficiency because the light leaking from the upper surface 11a shows a tendency to increase.

On the other hand, the long side surfaces 11a2 is provided for the purposes of: reflecting transmission light incident on the long side surfaces to thereby supply the reflected light to the short side surfaces and turning over the reflected light from the short side surfaces through the reflection layer 21 so that the light is transmitted to exit from the upper surface 11a; and receiving external light in a reflection mode so that the external light is reflected through the reflection layer 21 and transmitted to exit from the upper surface 11a. It is preferable from this point of view that the inclination angle $\theta_2$ of the long side surfaces with respect to the reference plane of the lower surface is in a range of from 0 to 10 degrees.

Although the inclination angle $\theta_2$ of the long side surfaces may be 0 degrees (horizontal), setting the angle to be larger than 0 degrees permits transmission light to be collimated when the transmission light incident on the long side surfaces is reflected to be supplied to the short side surfaces. In this case, directivity of light reflected through the short side surfaces can be enhanced to be favorable to display. On the other hand, if the inclination angle is larger than 10 degrees, the rate of light incident on the long side surfaces is lowered. As a result, light supply to the counter end side runs short, so that light emission is apt to be uneven. Moreover, the change of the optical path owing to refraction becomes large, so that the quantity of light in the frontal direction is reduced disadvantageously in display. Moreover, in the sectional shape of the light pipe, it becomes difficult to reduce the thickness on the counter end side. Hence, the quantity of light incident on the prism-like irregularities is also reduced, so that light emission efficiency is apt to be lowered.

From the point of view of the aforementioned performance such as condensation of output light and increase of the quantity of light in the frontal direction owing to the collimation of transmission light, suppression of leaking light, etc., the preferable inclination angle $\theta_2$ of the long side surfaces is not larger than 8 degrees, particularly not larger than 5 degrees. The inclination angles of the short and long side surfaces as described above are adjusted to permit directivity to be given to output light. Hence, light can be made to exit in the direction perpendicular to the lower surface or in the direction near the perpendicular direction with a near angle.

From the point of view of visual recognition of a display image through the long side surfaces of the light pipe, etc., the preferable long side surfaces have the angle difference in inclination angles $\theta_2$ between the long side surfaces which is set to be not larger than 5 degrees, particularly not larger than 4 degrees, more particularly not larger than 3 degrees on the whole of the light pipe, and have the difference in inclination angle $\theta_2$ between adjacent long side surfaces which is set to be not larger than 1 degree, particularly not larger than 0.3 degrees, more particularly not larger than 0.1 degrees. Hence, the difference in inclination angle $\theta_2$ between the long side surfaces through which light is transmitted can be prevented from having influence on the display image. If the deflection in transmission angle of the long side surfaces varies largely in accordance with the place, the display image is apt to be unnatural. Particularly if the deflection difference between transmission images is large in the vicinity of adjacent pixels, the display image is apt to be remarkably unnatural.

The aforementioned angle difference in inclination angle $\theta_2$ is determined on the assumption that the inclination angle of the long side surfaces is not larger than 10 degrees as described above. That is, the angle difference is determined on the assumption that deflection of the display image owing to refraction of light transmitted through the long side surfaces is suppressed to set the small inclination angle $\theta_2$ to be in an allowable range. This purpose is that the optimum viewing direction of the liquid-crystal display device optimized by setting a point of observation in a direction near the perpendicular direction is prevented from being changed. If the display image is deflected, the optimum viewing direction is displaced from the direction near the perpendicular direction. Moreover, if the deflection of the display image is large, the viewing direction comes near to the output direction of light leaking from the upper surface of the light pipe so that the leaking light may be apt to have influence such as reduction of contrast on the viewing direction. Incidentally, the condition for setting the inclination angle $\theta_2$ of the long side surfaces to be not larger than 10 degrees contains a requirement that the influence of dispersion of transmitted light is suppressed to be negligible.

From the point of view of obtaining a bright display image, it is preferable that the device is excellent in efficiency of incidence of external light and excellent in efficiency of transmission of the display image through the liquid-crystal cell or efficiency of output of the display image from the liquid-crystal cell. From this point of view, it is preferable that the upper surface of the light pipe is provided as prism-like irregularities in which the projected area of the long side surfaces on the reference plane of the lower surface is not smaller than 5 times, particularly not smaller than 10 times, more particularly not smaller than 15 times as large as that of the short side surfaces. Hence, a great part of the display image obtained through the liquid-crystal cell can be transmitted through the long side surfaces.

Incidentally, in transmission of the display image through the liquid-crystal cell, the display image incident on the short side surfaces is reflected on the incident side surface so as not to be made to exit from the upper surface or is deflected so as to be made to exit in the direction largely different from and opposite to the direction of the display image transmitted through the long side surfaces with a normal line with respect to the lower surface as a reference. Hence, the display image incident on the short side surfaces has little influence on the display image transmitted through the long side surfaces. Hence, from the point of view of prevention of unnatural display owing to shortage of transmission of display light, etc., the area of overlap of pixels with the short side surfaces is preferably reduced to thereby keep the light transmittance of the long side surfaces sufficient.

In consideration that the pixel pitch of the liquid-crystal cell is generally in a range of from 100 to 300 $\mu$m, it is preferable from the aforementioned point of view that each of the short side surfaces is formed to be not larger than 40 $\mu$m in terms of the projected width thereof on the reference plane of the lower surface. Incidentally, as the projected area of the short side surface decreases, a higher-grade technique is required for forming the short side surface. If the vertices of the prism-like irregularities are rounded with a curvature of radius not smaller than a predetermined value, a scattering effect is apt to appear to cause disorder of the display image. Further, because the coherence length of a fluorescent tube is generally set to be about 20 $\mu$m, reduction of the projected width of the short side surface is apt to cause reduction of display quality owing to diffraction. Accordingly, the especially preferable projected area of the short side surface is in a range of from 1 to 20 $\mu$m, particularly in a range of from 5 to 15 $\mu$m.

It is preferable from the aforementioned point of view that the distance between adjacent short side surfaces is large. As described above, however, the short side surfaces serve as a functional portion for substantially outputting light incident on the side surface. Hence, if the distance is too large, illumination at the time of switching-on becomes so sparse that display may be unnatural. In consideration of these, the repetition pitch P of the prism-like irregularities as shown in FIG. 2 is preferably set to be in a range of from 50 $\mu$m to 1.0 mm. Incidentally, the pitch may be constant or may be irregular as represented by a random pitch or a random or regular combination of a predetermined number of pitch units.

When the light output means is constituted by prism-like irregularities, moire may occur because of interference between the light output means and pixels of the liquid-crystal cell. Although prevention of moire can be made by the adjustment of the pitch of the prism-like irregularities, the pitch of the prism-like irregularities has a preferable range as described above. Hence, measures against the case where moire occurs in the pitch range are a subject of discussion.

Figure 3:
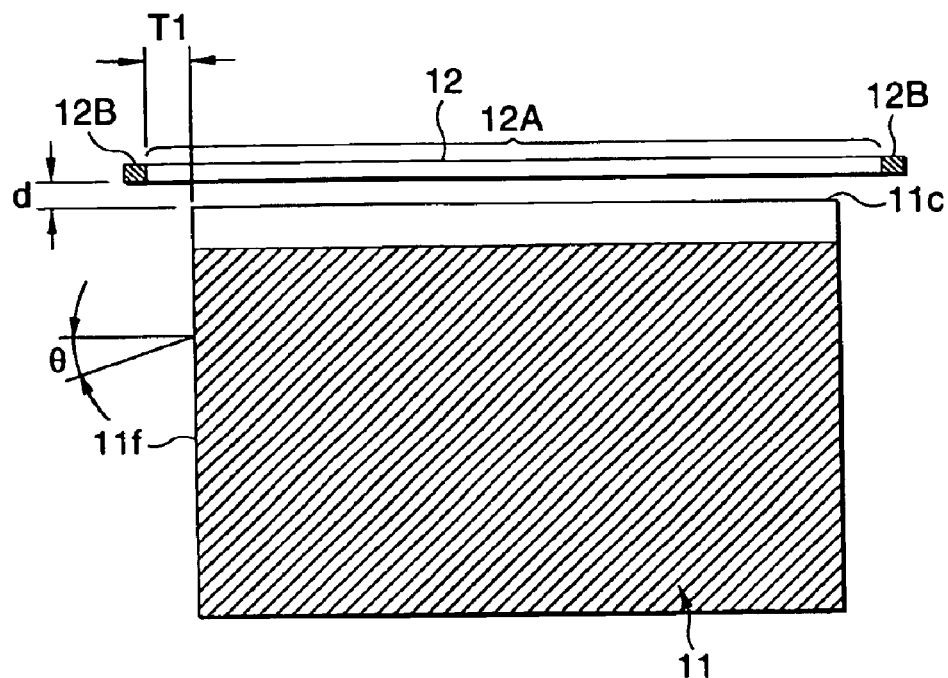
FIG. 3 is an explanatory view showing an example of arrangement of a linear light source.

According to the present invention, a method as shown in FIG. 3 is preferably used for prevention of moire. That is, in this method, the prism-like irregularities are formed to be inclined ($\theta$) with respect to the reference plane of the incidence side surface 11c so that the prism-like irregularities can be arranged to cross pixels. On this occasion, if the inclination angle $\theta$ is too large, deflection occurs in reflection through the short side surfaces. As a result, large deviation occurs in the direction of output light. Hence, anisotropy in the intensity of light emission in the light-transmitting direction of the light pipe becomes large, so that light utilizing efficiency is lowered. This is apt to cause reduction of display quality.

Figure 4:
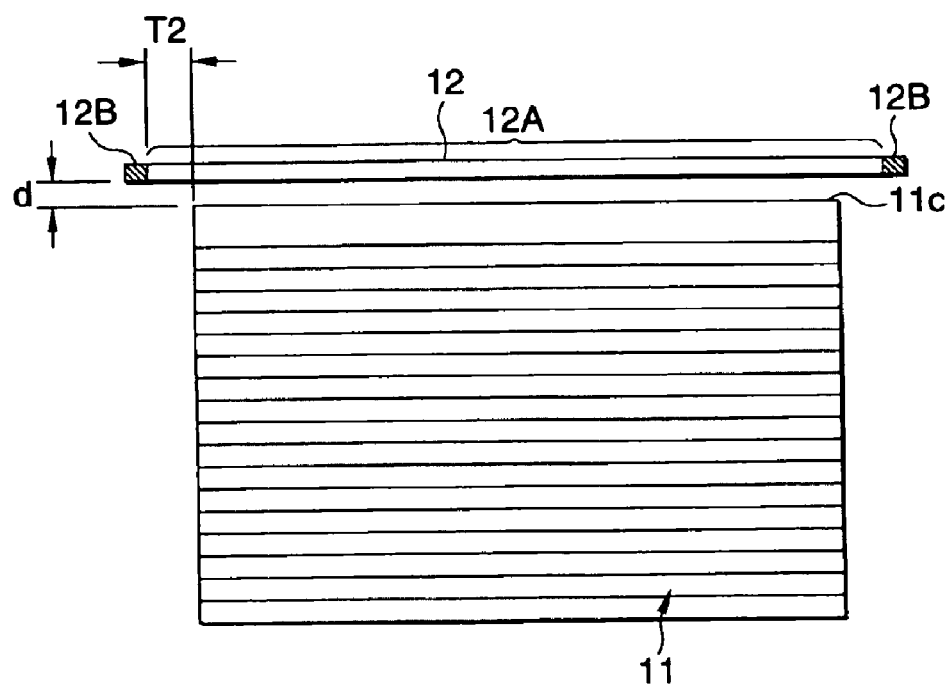
FIG. 4 is an explanatory view showing another example of arrangement of a linear light source.

From the aforementioned point of view, the inclination angle $\theta$ of the direction of arrangement of the prism-like irregularities, that is, the direction of each ridgeline of the prism-like irregularities with respect to the reference plane of the incidence side surface is preferably set to be in a range of ±30 degrees, particularly in a range of ±28 degrees, more particularly in a range of ±25 degrees. Incidentally, the symbol "±" means the direction of inclination with the incidence side surface as a reference. If the resolution of the liquid-crystal cell is so low that no moire occurs or moire is negligible, it is preferable that the prism-like irregularities are arranged to be as parallel with the incidence side surface as possible as shown in FIG. 4 ($\theta$=0 degrees).

The light pipe may be formed into a suitable shape as described above. Also in the case where the light pipe is shaped like a wedge, etc., the shape can be determined suitably. For example, a suitable surface shape such as a linear surface or a curved surface can be used. Further, the slopes or prism-like irregularities constituting the light output means may be formed into a suitable surface shape such as a linear surface, a folded surface or a curved surface. Further, the irregularities such as prism-like irregularities may be constituted by a combination of irregularities different in shape, etc. in addition to pitch. In addition, the irregularities such as prism-like irregularities may be formed as a series of convex or concave portions having ridgelines continuously connected to one another or may be formed as intermittent convex or concave portions discontinuously arranged at intervals of a predetermined distance in the direction of each ridgeline.

The shape of the lower surface or incidence side surface in the light pipe is not particularly limited and may be determined suitably. Generally, a surface as smooth and flat as possible is formed as the lower surface and a surface perpendicular to the lower surface is formed as the incidence side surface. For example, a shape such as a concavely curved shape corresponding to the outer circumference of the linear light source may be used as the shape of the incidence side surface so that efficiency of incidence of light can be enhanced. Further, the incidence side surface may be designed to have an incidence side surface structure having an introduction portion interposed between the linear light source and the light pipe. In this case, the introduction portion can be formed into a suitable shape corresponding to the linear light source, or the like.

The light pipe may be made of a suitable material exhibiting transparency in accordance with the wave range of the linear light source. Incidentally, examples of the material to be used in a visible light range are transparent resin represented by acrylic resin, polycarbonate resin or epoxy resin, glass, etc. A light pipe made of a material exhibiting no birefringence or small birefringence may be used preferably.

The light pipe may be formed by a suitable method such as a cutting method. Examples of the production method which is preferable from the point of view of mass production include a method in which a thermoplastic resin is pressed against a mold capable of forming a predetermined shape under heating to thereby transfer the shape; a method in which a mold capable of forming a predetermined shape is filled with a hot-melted thermoplastic resin or a resin fluidized by heat or through a solvent; a method in which a fluid resin polymerizable by heat, ultraviolet rays or radial rays is polymerized in the condition that the fluid resin is cast in a mold capable of forming a predetermined shape or the mold is filled with the fluid resin; and so on.

Incidentally, the light pipe need not be formed as a monolithic single-layer plate made of one kind of material. For example, the light pipe may be formed as a laminate of parts made of one kind of material or different kinds of materials. For example, the light pipe may be provided as a plate in which a sheet having a light output means (upper surface) such as prism-like irregularities adheres to a light guide portion for performing transmission of light.

The thickness of the light pipe can be determined suitably in accordance with the size of the light pipe, the size of the linear light source, etc. in accordance with the purpose of use. Generally, the thickness of the light pipe to be used for forming a liquid-crystal display device, or the like, is not larger than 10 mm, particularly in a range of from 0.1 to 5 mm, more particularly in a range of from 0.3 to 3 mm in terms of the thickness of the incidence side surface. From the point of view of achievement of bright display, etc., a preferable light pipe is designed so that the total light transmittance of incident light in the direction of the upper and lower surfaces, particularly the total light transmittance of perpendicular incident light from the lower surface to the upper surface is not smaller than 90%, particularly not smaller than 92%, more particularly not larger than 95%, and the haze is not larger than 30%, particularly not larger than 15%, more particularly not larger than 10%.

According to the aforementioned light pipe, incident light from the upper and lower surfaces is transmitted well to exit from the lower or upper surface. Hence, accurately collimated light can be output in a direction excellent in perpendicularity favorable to viewing by use of the light pipe so that light from the linear light source is utilized efficiently. Hence, a plane light source unit excellent in brightness can be formed. Moreover, it is possible to form various devices, such as a power-saving reflection type liquid-crystal display device, which is excellent in contrast in view at the time of switching-off and switching-on and excellent in brightness of display because light leaking from the upper surface hardly overlaps the display image. Further, the device is excellent in clarity because the display image through the light pipe is hardly disordered, and the device is further excellent in display quality because the device is easy to view.

For example, the plane light source unit according to the present invention is used as a side-lighting type front-lighting system by which information light (2) generated in the lower surface of the light pipe 11 as shown in FIG. 1 is transmitted to exit from the upper surface of the light pipe. The plane light source unit can be formed in such a process in which the linear light source 12 having an effective light emission region longer than the longitudinal length of the incidence side surface 11c of the light pipe is disposed on the incidence side surface 11c of the light pipe.

In the above description, the linear light source 12 having the effective light emission region longer than the incidence side surface 11c is used for preventing production of shade. That is, if the length of the linear light source is short even when the length is the order of mm, the quantity of incident light in end portions of the light pipe becomes so small that uneven light emission may occur or a non-emission region may be produced. Hence, very clear shade may be produced at the time of switching-on, so that display becomes very hard to view. Hence, the linear light source 12 having the effective light emission region longer than the incidence side surface 11c is used for preventing these problems.

Incidentally, if the effective light emission region of the linear light source is shorter than the incidence side surface, shade is produced even in the frontal direction at the time of switching-on. The shade in the frontal direction can be prevented when the length of the effective light emission region is set to be equal to the length of the incidence side surface. Even in this case, however, shade is produced in an obliquely viewing direction. The shade based on a non-emission portion of the light pipe in the obliquely viewing direction is more conspicuous than the shade in the frontal direction because the shade in the obliquely viewing direction is produced so obliquely as to cross the display portion.

The state of production of the shade changes in accordance with whether the linear light source is disposed close to the incidence side surface of the light pipe or whether the linear light source is disposed at a distance from the incidence side surface of the light pipe. The larger the distance, the wider the range of production of shade. As occasion demands, the arrangement of the linear light source at a distance from the incidence side surface of the light pipe is used for avoiding a risk that the linear light source is broken by contact with the light pipe when the linear light source is arranged close to the incidence side surface.

Further, the state of production of the shade changes in accordance with the fact as to whether the ridgelines of the irregularities of the light output means of the light pipe are inclined with respect to the incidence side surface or not. Moreover, the state of production of the shade changes in accordance with the inclination angle of the ridgelines. When, for example, each ridgeline is inclined ($\theta \neq 0$) with respect to the incidence side surface 11c when $\theta$ represents the inclination angle of each ridgeline of the irregularities with respect to the incidence side surface 11c in FIG. 3, shade is produced obliquely even in the frontal direction, like the obliquely viewing direction, on a side 11f in which the ridgeline of the irregularities becomes far from the linear light source. The shade is directed toward the inside of the light pipe with the 11f-side end of the incidence side surface as a start point. Hence, on the other end side of the incidence side surface, the influence of the shade is small because the shade extends outward.

Hence, the length of the linear light source based on the effective light emission region is determined suitably in accordance with the state of production of shade, etc. in addition to the length of the incidence side surface of the light pipe in the longitudinal direction. From the point of view of making light incident on the incidence side surface of the light pipe as evenly as possible to thereby prevent shade from being produced in a frontal direction and in a practical obliquely viewing range, particularly in a viewing angle range of 30 degrees obliquely, it is preferable that each end of the effective light emission region 12A of the linear light source 12 is protruded, by a distance not smaller than a value calculated by the expression: 1 mm+d·sin $\theta$+d/2, from a corresponding end surface of the light pipe when d is the distance between the incidence side surface 11c and the front end surface of the linear light source 12 in addition to the inclination angle $\theta$ as shown in FIG. 3.

Hence, when $\theta$=0 as shown in FIG. 4, that is, when each ridgeline of the irregularities is parallel with the incidence side surface, it is preferable that the length T2 of protrusion is larger than 1 mm+d/2. On the other hand, when $\theta \neq 0$ as shown in FIG. 3, it is preferable that the length T1 of protrusion is larger than the value calculated by the aforementioned expression on the end 11f of the light pipe as described above. Incidentally, in FIGS. 3 and 4, the reference numeral 12B designates a non-emission region such as an electrode.

In the above description, when $\theta$=0, it is preferable that the opposite end portions of the light pipe satisfy the condition for the protrusion length of the linear light source calculated by the aforementioned expression because the ridgelines are laterally symmetrical. When $\theta \neq 0$, it is preferable that at least the end 11f of the light pipe satisfies the condition. When $\theta \neq 0$, on the side of the light pipe opposite to the end 11f, production of shade may be prevented even by a linear light source having an effective light emission region with such a length that the region becomes the inside of the light pipe. Even in this case, it is preferable that the length of the effective light emission region on the whole of the linear light source is not smaller than 2 mm+d.

A suitable material can be used as the linear light source. Generally, a linear light source such as a (cold or hot) cathode tube, an array of point light sources such as light-emitting diodes arranged linearly or a linear light source using a device for converting a point light source into a state of linear light emission at regular or irregular intervals may be used as the light source. It is particularly preferable to use a cold-cathode tube from the point of view of power saving, durability, etc.

The plane light source unit may be formed as a combination in which suitable assisting means such as a light source holder 13 for enclosing the linear light source 12 to lead light scattered from the linear light source 12 to the incidence side surface 11c of the light pipe as shown in FIG. 1, an anti-reflection layer, etc. are arranged as occasion demands. A resin sheet coated with a high-reflectance metal thin film, a sheet of metal foil, or the like, is generally used as the light source holder. If the light source holder is stuck to the end portion of the light pipe through an adhesive agent, or the like, the formation of the light output means in the adhesive portion can be omitted.

The anti-reflection layer is used for suppressing surface reflection. The anti-reflection layer may be formed as a suitable transparent layer in accordance with the background art such as an optical multilayer film or a reflective index layer made of a dielectric, a fluorine-containing polymer, a low-density material, etc. The anti-reflection layer may be provided on at least one of the upper and lower surfaces of the light pipe directly by a suitable method such as a coating method or a vapor deposition method. The anti-reflection layer may be provided by a method in which: the anti-reflection layer is supported by a transparent substrate to thereby form a sheet; the sheet is stuck to the lower surface of the light pipe through a suitable adhesive means such as an adhesive layer. The method for forming the anti-reflection layer is not particularly limited.

As described above, the plane light source unit according to the present invention provides light excellent in light utilizing efficiency, bright and excellent in perpendicularity. It is easy to increase the area of the plane light source unit. Hence, the plane light source unit can be used as a front-lighting system preferably applied to various devices such as a reflection type liquid-crystal display device, etc. A power-saving reflection type liquid-crystal display device bright and easy to view can be obtained. Incidentally, the plane light source unit can be switched on/off by a suitable method.

FIG. 1 shows a reflection type liquid-crystal display device using the plane light source unit 1 according to the present invention as a front-lighting system. The reference numeral 2 designates a reflection type liquid-crystal panel; 22, a liquid-crystal layer; and 23, a cell substrate. These members constitute a liquid-crystal cell. The reference numeral 24 designates a polarizer; and 21, a reflection layer. The reflection type liquid-crystal display device can be formed by arrangement of the liquid-crystal cell having the reflection laser on the light output side of the plane light source unit as shown in FIG. 1, that is, on the lower surface side of the light pipe 11.

Generally, the reflection type liquid-crystal display device is formed by assembling a liquid-crystal cell having a transparent electrode functioning as a liquid-crystal shutter, a driver attached to the liquid-crystal cell, a polarizer, a front-lighting unit and a reflection layer and by assembling constituent parts such as a diffusing layer, a compensatory retarder plate, etc. suitably as occasion demands. In the present invention, the reflection type liquid-crystal display device can be formed in accordance with the background art without any specific limitation except that the plane light source unit is used on the front side. Incidentally, the transparent electrode is not shown in FIG. 1.

Hence, the liquid-crystal cell to be used is not particularly limited. For example, on the basis of the format of orientation of liquid crystal, there can be used a suitable liquid-crystal cell such as a TN liquid-crystal cell, an STN liquid-crystal cell, a perpendicularly oriented cell, an HAN cell, a twisted or non-twisted cell such as an OCB cell, a guest-host liquid-crystal cell, or a ferroelectric liquid-crystal cell. Further, the method for driving liquid crystal is not particularly limited. For example, a suitable drive method such as an active matrix method or a passive matrix method may be used.

The arrangement of the reflection layer is essential to the reflection type liquid-crystal display device. The position of arrangement of the reflection layer is optional. For example, the reflection layer may be provided in the outside of the liquid-crystal display panel 2 as shown in FIG. 1 or may be attached to the cell substrate and provided in the inside of the liquid-crystal cell. The reflection layer can be formed as a suitable reflection layer according to the background art. Examples of the reflection layer are: a coating layer containing powder of a high-refractive-index metal such as aluminum, silver, gold, copper or chromium in a binder resin; a layer of a metal thin film deposited by a vapor deposition method, or the like; a reflection sheet having the coating or deposited layer supported by a substrate; a sheet of metal foil; and so on. For example, the reflection layer provided in the inside of the liquid-crystal cell can be formed of a transparent electrically conductive film, or the like.

Any suitable material can be used as the polarizer. A material high in the degree of polarization such as an absorption type linear polarizer of iodine or dye can be used preferably from the point of view of obtaining good-contrast display owing to incidence of high-grade linearly polarized light, etc. Incidentally, when the reflection type liquid-crystal display device is formed, a suitable optical device such as a diffusing layer, a protective layer or a compensatory retarder plate can be arranged suitably. In this case, a material exhibiting a weak diffusing characteristic so that the display image is not disordered can be used as the diffusing layer.

On the other hand, the aforementioned compensatory retarder plate is provided for compensating for wavelength dependence of birefringence, or the like, to attain improvement of visibility, or the like. The compensatory retarder plate is disposed both between the visual side polarizer and the liquid-crystal cell and between the back side polarizer and the liquid-crystal cell. A suitable material in accordance with the wave range can be used as the compensatory retarder plate. The compensatory retarder plate may be formed as a single layer or as a multilayer of two or more phase-difference layers.

The reflection type liquid-crystal display according to the present invention is viewed through light transmitted through the plane light source unit, particularly through the long side surfaces of the light pipe in the plane light source unit. That is, when the plane light source unit is switched on, light exiting from the lower surface of the light pipe is reflected through the reflection layer via the polarizer, the liquid-crystal layer, etc. The reflected light reaches the light pipe via the liquid-crystal layer, the polarizer, etc. in the reverse course. A display image transmitted through the long side surfaces is viewed. In this case, intensive leaking light exits in a direction largely different in angle from the frontal direction perpendicular to the liquid-crystal cell. Hence, because leaking light exiting in the frontal direction is weak, a display image excellent in display quality can be viewed through the long side surfaces in a direction near the frontal direction.

On the other hand, also in the case where external light is used when the plane light source unit is switched off, incident light from the long side surfaces in the upper surface of the light pipe is transmitted through the polarizer, the liquid-crystal layer, the reflection layer, etc. and reaches the light pipe in the reverse course in the same manner as described above. A display image transmitted through the long side surfaces can be viewed in a direction near the frontal direction in a state in which the display image is little in disorder owing to the light pipe and excellent in display quality.

Optical devices or parts such as a light pipe, a liquid-crystal cell, a polarizer, etc. for constituting the aforementioned plane light source unit or the liquid-crystal display device may be wholly or partially integrally laminated/fixed onto one another or may be disposed separably. From the point of view of prevention of reduction of contrast based on suppression of surface reflection, etc., it is preferable that such parts are fixed onto one another. It is preferable that at least the lower surface of the light pipe in the plane light source unit is fixed closely to the upper surface of the liquid-crystal cell. A suitable transparent adhesive agent such as a tackifier may be used for the closely fixing process. A layer of the transparent adhesive agent may be made to contain transparent particles so that the layer is provided as an adhesive layer exhibiting a diffusing function.

EXAMPLE 1

A mold, in which a mold core having a surface cut into a predetermined shape by a diamond bit was mounted, was heated to 80° C. and filled with molten polymethyl methacrylate heated at 260° C. Thus, a light pipe was obtained. The light pipe had a width of 40 mm and a depth of 25 mm. The light pipe had an incidence side surface having a thickness of 1 mm, and a counter end having a thickness of 0.6 mm. The light pipe had flat upper and lower surfaces. The light pipe had prism-like irregularities in the upper surface. The prism-like irregularities ($\theta=0$) were disposed at a pitch of 210 $\mu$m so as to be parallel with the incidence side surface. The prism-like irregularities had short surfaces, and long side surfaces. The inclination angles of the short side surfaces changed in a range of from 42.5 to 43 degrees. The inclination angles of the long side surfaces changed in a range of from 1.8 to 3.5 degrees. The inclination angle difference between adjacent long side surfaces was not larger than 0.1 degrees. The projected width of each short side surface on the lower surface was in a range of from 10 to 16 $\mu$m. The ratio of the projected area of the long side surfaces on the lower surface to the projected area of the short side surfaces on the lower surface was not smaller than 12. Incidentally, the prism-like irregularities were formed to start from a position 2 mm from the incidence side surface.

A cold-cathode tube (manufactured by West Electric Co., Ltd.) having a diameter of 2 mm and a length of 195 mm was wound with a first black tape having a width of 20 mm in a position far by 30 mm from one end of its effective light emission region and was wound with a second black tape having a width of 20 mm in a position far by 20 mm from the other end of its effective light emission region. Thus, a linear light source was prepared. After a TN type reflection liquid-crystal panel was disposed on the lower surface of the light pipe, the linear light source was disposed closely (d=0)

on the incidence side surface of the light pipe. A portion of the linear light source between the first and second back tapes was enclosed in a holder. An inverter and a DC power supply were connected to the linear light source. Thus, a reflection type liquid-crystal display device was obtained. The plane light source could be switched on/off by turning on/off the power supply.

The reflection type liquid-crystal display device was examined on the state of production of shade in a frontal direction and in obliquely viewing directions at left and right angles of 30 degrees in the condition that the position of the linear light source in an ON state was moved left and right. The case where no shade was produced was evaluated as ○. The case where weak shade was produced was evaluated as Δ. The case where shade was produced distinctly was evaluated as X. Incidentally, the direction of the inside of the light pipe and the direction of the outside of the light pipe were expressed as "−" and "+" respectively with the position of coincidence between the inner end of the first black tape of the linear light source and the left end of the incidence side surface of the light pipe as a point (0) of reference. Results of the evaluation were shown in Table 1.

TABLE 1

| Light Source Position (mm) | −3 | −2 | −1 | 0 | +1 | +2 | +3 |
|---|---|---|---|---|---|---|---|
| Right 30 Degrees | X | X | X | X | ○ | ○ | ○ |
| Frontal | X | X | X | ○ | ○ | ○ | ○ |
| Left 30 Degrees | X | X | Δ | ○ | ○ | ○ | ○ |

EXAMPLE 2

A plane light source unit and a reflection type liquid-crystal display device were obtained in the same manner as in Example 1 except that the linear light source was disposed in a position far by 2 mm (d=2) from the incidence side surface through 2 mm-thick spacers and cover plates on the opposite sides of the light pipe. The reflection type liquid-crystal display device was examined on shade. Results of the evaluation were shown in Table 2.

TABLE 2

| Light Source Position (mm) | −3 | −2 | −1 | 0 | +1 | +2 | +3 |
|---|---|---|---|---|---|---|---|
| Right 30 Degrees | X | X | X | X | X | ○ | ○ |
| Frontal | X | X | X | Δ | ○ | ○ | ○ |
| Left 30 Degrees | X | X | Δ | ○ | ○ | ○ | ○ |

EXAMPLE 3

A plane light source unit and a reflection type liquid-crystal display device were obtained in the same manner as in Example 2 except that the linear light source was disposed in a position far by 4 mm (d=4) from the incidence side surface. The reflection type liquid-crystal display device was examined on shade. Results of the evaluation were shown in Table 3.

TABLE 3

| Light Source Position (mm) | −3 | −2 | −1 | 0 | +1 | +2 | +3 |
|---|---|---|---|---|---|---|---|
| Right 30 Degrees | X | X | X | X | Δ | Δ | ○ |
| Frontal | X | X | Δ | Δ | Δ | ○ | ○ |
| Left 30 Degrees | X | X | Δ | ○ | ○ | ○ | ○ |

EXAMPLE 4

A light pipe (θ=23) was formed in the same manner as in Example 1 so that each ridgeline of the prism-like irregularities was inclined up rightward at an angle of 23 degrees with respect to the incidence side surface. A plane light source unit and a reflection type liquid-crystal display device were obtained by use of the light pipe. The reflection type liquid-crystal display device was examined on shade. Incidentally, on this occasion, the right end side of the light pipe was also examined on the state of production of shade. The direction of the inside of the light pipe and the direction of the outside of the light pipe were expressed as "−" and "+" respectively with the position of coincidence between the inner end of the second black tape of the linear light source and the right end of the incidence side surface of the light pipe as a point (0) of reference. Results of the evaluation were shown in Table 4.

TABLE 4

| Light Source Position (mm) | | −3 | −2 | −1 | 0 | +1 | +2 | +3 |
|---|---|---|---|---|---|---|---|---|
| Left End Side | Right 30 Degrees | X | X | X | X | ○ | ○ | ○ |
| | Frontal | X | X | X | ○ | ○ | ○ | ○ |
| | Left 30 Degrees | X | X | Δ | ○ | ○ | ○ | ○ |
| Right End Side | Right 30 Degrees | X | X | Δ | ○ | ○ | ○ | ○ |
| | Frontal | X | X | ○ | ○ | ○ | ○ | ○ |
| | Left 30 Degrees | ○ | ○ | ○ | ○ | ○ | ○ | ○ |

EXAMPLE 5

A plane light source unit and a reflection type liquid-crystal display device were obtained in the same manner as in Example 4 except that the linear light source was disposed in a position far by 2 mm (d=2) from the incidence side surface through 2 mm-thick spacers and cover plates on the opposite sides of the light pipe. The reflection type liquid-crystal display device was examined on shade. Results of the evaluation were shown in Table 5.

TABLE 5

| Light Source Position (mm) | | −3 | −2 | −1 | 0 | +1 | +2 | +3 |
|---|---|---|---|---|---|---|---|---|
| Left End Side | Right 30 Degrees | X | X | X | X | Δ | Δ | ○ |
| | Frontal | X | X | X | Δ | Δ | ○ | ○ |
| | Left 30 Degrees | X | X | Δ | ○ | ○ | ○ | ○ |
| Right End Side | Right 30 Degrees | X | X | X | Δ | ○ | ○ | ○ |
| | Frontal | X | X | ○ | ○ | ○ | ○ | ○ |
| | Left 30 Degrees | ○ | ○ | ○ | ○ | ○ | ○ | ○ |

EXAMPLE 6

A plane light source unit and a reflection type liquid-crystal display device were obtained in the same manner as in Example 5 except that the linear light source was disposed in a position distanced by 4 mm (d=4) from the incidence side surface. The reflection type liquid-crystal display device was examined on shade. Results of the evaluation were shown in Table 6.

TABLE 6

| Light Source Position (mm) | | −3 | −2 | −1 | 0 | +1 | +2 | +3 | +4 | +5 |
|---|---|---|---|---|---|---|---|---|---|---|
| Left End Side | Right 30 Degrees | X | X | X | X | Δ | Δ | Δ | Δ | ○ |
| | Frontal | X | X | X | Δ | Δ | Δ | Δ | Δ | ○ |
| | Left 30 Degrees | X | X | X | Δ | Δ | ○ | ○ | ○ | ○ |
| Right End Side | Right 30 Degrees | X | X | X | Δ | Δ | ○ | ○ | ○ | ○ |
| | Frontal | X | X | Δ | Δ | ○ | ○ | ○ | ○ | ○ |
| | Left 30 Degrees | ○ | ○ | ○ | ○ | ○ | ○ | ○ | ○ | ○ |

It was apparent from Tables 1 to 3 that the provision of the protrusion length (T2) not smaller than 1 mm+d/2 made it possible to prevent production of shade in the condition of θ=0. The same result was obtained also in the right end side of the light pipe. Incidentally, when shade was produced, the shade made it difficult to view display on the basis of remarkable unevenness of light emission.

On the other hand, it was apparent from Tables 4 to 6 that the state of production of shade changed in accordance with d (the distance between the light pipe and the light source) in the condition of θ≠0 (that is, the ridgelines of the irregularities were inclined), like the case of θ=0. It was apparent from comparison between Tables 5 and 6 and Tables 2 and 3 that if the ridgelines were inclined, the range of production of shade on the 11f side was widened, and that the provision of the protrusion length (T1) not smaller than 1 mm+d·sin θ+d/2 made it possible to prevent production of shade.

On one hand, on the right end side of the light pipe opposite to the 11f side, there was some case where shade was not produced though the effective light emission region was in the inside of the light pipe (Table 4). Also in this case, it was to be understood that the effective light emission region was required to have a length not smaller than 2 mm+d from the point of view of preventing production of shade as a whole between the opposite sides of the light pipe. Incidentally, in the above description, as d increases, the boundary of production of shade was more hardly judged and there was a tendency that shade itself was thinned.

On the other hand, in external light illumination in the condition that the light source was switched off, clear display could be achieved. It was apparent from the above description that a front-lighting reflection type liquid-crystal display device being excellent in brightness and uniformity in each state of switching-on and switching-off and exhibiting clear display could be obtained.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A plane light source unit comprising:
    a light pipe including an upper surface, a lower surface, and an incidence side surface, and including a light output means formed in said upper surface so that light incident on said incidence side surface exits from said lower surface through said light output means while light incident on said lower surface is transmitted through said upper surface; and
    a linear light source disposed on said incidence side surface of said light pipe, said linear light source having an effective light emission region which is longer than a longitudinal length of said incidence side surface,
    whereby information light generated on the lower surface of said light pipe is transmitted and made visible through the upper surface of said light pipe.

2. A plane light source unit comprising:
    a light pipe including an upper surface, a lower surface, and an incidence side surface, and including a light output means formed in said upper surface so that light incident on said incidence side surface exits from said lower surface through said light output means while light incident on said lower surface is transmitted through said upper surface; and
    a linear light source disposed on said incidence side surface of said light pipe, said linear light source having an effective light emission region which is longer than a longitudinal length of said incidence side surface,
    whereby information light generated on the lower surface of said light pipe is transmitted and made visible through the upper surface of said light pipe, and
    wherein said light output means of said light pipe has a repetitive structure of prism-like irregularities arranged at intervals of a pitch in a range of from 50 $\mu$m to 1.0 mm, each of said prism-like irregularities being constituted by a combination of a short side surface and a long side surface;
    said short side surface is made of a slope inclined down from said incidence side surface toward an end side opposite to said incidence side surface at an inclination angle in a range of from 30 to 45 degrees with respect to a reference plane of said lower surface; and
    said long side surface is made of a slope having an inclination angle in a range of from 0 to 10 degrees with respect to said reference plane, so that a difference between the inclination angles is not larger than 5 degrees as a whole, the difference between the inclination angles of adjacent long side surfaces is not larger than 1 degree, and a projected area of said long side surface on said reference plane is not smaller than five times as large as that of said short side surface.

3. A plane light source unit according to claim 2, wherein said prism-like irregularities constituting said light output means of said light pipe have ridgelines each having an inclination in a range of ±30 degrees with respect to a reference plane of said incidence side surface.

4. A plane light source unit according to claim 3, wherein each end of said effective light emission region of said linear light source protrudes by a distance not smaller than a value calculated by an expression: 1 mm+d·sin θ+d/2, from a corresponding end surface of said light pipe corresponding to a side in which said ridgeline of said prism-like irregularities of said light pipe drifts apart from said linear light source,
    wherein θ is an inclination angle of said ridgeline of said prism-like irregularities with respect to said incidence side surface, and
    d is a distance between said incidence side surface and a front end surface of said linear light source.

5. A reflection type liquid-crystal display device comprising a plane light source unit according to claim 1, and a liquid-crystal cell disposed on a lower surface of said plane light source unit, said liquid-crystal cell including a reflection layer.

6. A reflection type liquid-crystal display device comprising a plane light source unit according to claim 2, and a liquid-crystal cell disposed on a lower surface of said plane light source unit, said liquid-crystal cell including a reflection layer.

7. A reflection type liquid-crystal display device comprising a plane light source unit according to claim 3, and a liquid-crystal cell disposed on a lower surface of said plane light source unit, said liquid-crystal cell including a reflection layer.

8. A reflection type liquid-crystal display device comprising a plane light source unit according to claim 4, and a liquid-crystal cell disposed on a lower surface of said plane light source unit, said liquid-crystal cell including a reflection layer.

9. A plane light source unit according to claim 1, wherein the information light on the lower surface of said light pipe is constituted by an image and the image is visibly transmitted and made visible through the upper surface of said light pipe.

10. A plane light source unit according to claim 9, wherein the image is provided by a liquid crystal cell, which is provided separately from said light pipe.

11. A plane light source unit comprising:
- a light pipe including an upper surface, a lower surface, and an incidence side surface, and further including a light output means formed in proximity to the upper surface, wherein light incident on the incidence side surface exits said light pipe from the lower surface through the light output means and light incident on the lower surface is transmitted through the upper surface; and
- a linear light source disposed adjacent to the incidence side surface of said light pipe, said linear light source having an effective light emission region which is longer than a longitudinal length of the incidence side surface,
- wherein the light output means of said light pipe has a repetitive structure of prism-like irregularities, each of said prism-like irregularities being constituted by a combination of a short side surface and a long side surface and the short side surface is made of a slope inclined down from the incidence side surface toward an end side opposite to said incidence side surface at an inclination angle in a range of from 30 to 45 degrees with respect to a reference plane of the lower surface and the long side surface is made of a slope having an inclination angle in a range of from 0 to 10 degrees with respect to the reference plane.

12. A plane light source unit as claimed in claim 11, wherein a difference between the inclination angles is not larger than 5 degrees as a whole, the difference between the inclination angles of adjacent long side surfaces is not larger than 1 degree, and a projected area of the long side surface on the reference plane is not smaller than five times as large as that of the short side surface.

* * * * *